United States Patent [19]

Leu

[11] Patent Number: 5,640,318
[45] Date of Patent: Jun. 17, 1997

[54] FORWARD CONVERTER FOR OFF-LINE APPLICATIONS

[76] Inventor: Ching-shan Leu, 5th Fl., No. 7, Lane 21, Sulin 7th Street, Taoyuan City, Taiwan

[21] Appl. No.: 673,578

[22] Filed: Jul. 1, 1996

[51] Int. Cl.[6] ................................................. H02M 7/537
[52] U.S. Cl. ................................................. 363/131; 363/16
[58] Field of Search ................................................. 363/15, 16, 20, 363/21, 131

[56] References Cited

U.S. PATENT DOCUMENTS

| | | | |
|---|---|---|---|
| 4,245,286 | 1/1981 | Paulkovich et al. | 363/21 |
| 4,618,919 | 10/1986 | Martin | 363/16 |
| 4,695,935 | 9/1987 | Oen et al. | 363/21 |
| 5,019,954 | 5/1991 | Bourgeault et al. | 363/21 |
| 5,351,175 | 9/1994 | Blankenship | 363/16 |
| 5,508,903 | 4/1996 | Alexndrov | 363/16 |
| 5,523,936 | 6/1996 | Leu et al. | 363/21 |
| 5,544,032 | 8/1996 | Mimura | 363/16 |

*Primary Examiner*—Jeffrey L. Sterrett
*Attorney, Agent, or Firm*—Martin Korn

[57] ABSTRACT

A forward converter for a switching power supply includes a direct current voltage source having a positive electrode and a negative electrode, a transformer having four identical primary windings each having a first end and a second end and a secondary winding connected to a load, the first end of a first primary winding and the second end of a fourth primary winding being connected to the positive electrode of the voltage source, the first end of a third primary winding and the second end of a second primary winding are connected to the negative electrode of the voltage source, two series-connected power switches connected between the second end of the first primary winding and the first end of the second primary winding and defining a common point between the power switches for simultaneously turning on and off in response to a control signal, a first diode connected between the common point of the power switches and the first end of the fourth primary winding, a second diode connected between the second end of the third primary winding and the first end of the fourth primary winding, a first capacitor connected between the second ends of the first and the third primary windings, and a second capacitor connected between the first ends of the second and the fourth primary windings.

1 Claim, 4 Drawing Sheets

FORWARD CONVERTER FOR OFF-LINE APPLICATIONS

BACKGROUND OF THE INVENTION

The present invention relates to a switching power supply, and particularly to a forward converter for an off-line switching power supply.

Switching mode power supplies are often used in small-size electrical appliances such as a personal computer. A plurality of low voltage stress forward configurations of switching mode power supplies have been developed. However, such configurations still require a large input filter to reduce the noises caused by a pulsating input current of a forward converter.

U.S. Pat. No. 5,523,936 issued to the inventor of the present invention and Hwang, discloses a built-in input filter forward converter. A power switch and two cross-coupled capacitors are respectively connected to a split-winding transformer. When the power switch is turned off, an input current of the converter can flow through a path provided by the cross-coupled capacitors. However, such an arrangement requires a high voltage rating power switch in off-line applications, thus, the cost is increased and the reliability is reduced. Further, a resistance of the power switch is large and a power loss will also be increased.

SUMMARY OF THE INVENTION

An object of the present invention is to provide a novel forward converter for a switching mode power supply which has a built-in input filter for maintaining the input current in a non-pulsating fashion.

Another object of the present invention is to provide a novel forward converter with a leakage inductance and two cross-coupled capacitors being a lossless snubber.

A further object of the present invention is to provide a novel forward converter with two cross-coupled capacitors for storing and recovering leakage energy thereby improving the converter's efficiency.

A further object of the present invention is to provide a novel forward converter having two low voltage rating power switches to be used in off-line applications and to overcome the disadvantages mentioned above.

According to the present invention, a forward converter for a switching power supply includes a direct current voltage source having a positive electrode and a negative electrode, a transformer having four identical primary windings each having a first end and a second end and a secondary winding connected to a load, the first end of a first primary winding and the second end of a fourth primary winding being connected to the positive electrode of the voltage source, the first end of a third primary winding and the second end of a second primary winding are connected to the negative electrode of the voltage source, two series-connected power switches connected between the second end of the first primary winding and the first end of the second primary winding and defining a common point between the power switches for simultaneously turning on and off in response to a control signal, a first diode connected between the common point of the power switches and the first end of the fourth primary winding, a second diode connected between the second end of the third primary winding and the first end of the fourth primary winding, a first capacitor connected between the second ends of the first and the third primary windings, and a second capacitor connected between the first ends of the second and the fourth primary windings.

Other objects, advantages, and novel features of the invention will become more apparent from the following detailed description when taken in conjunction with the accompanying drawings.

DETAILED DESCRIPTION OF THE PREFERRED EMBODIMENTS

Figure 1A:
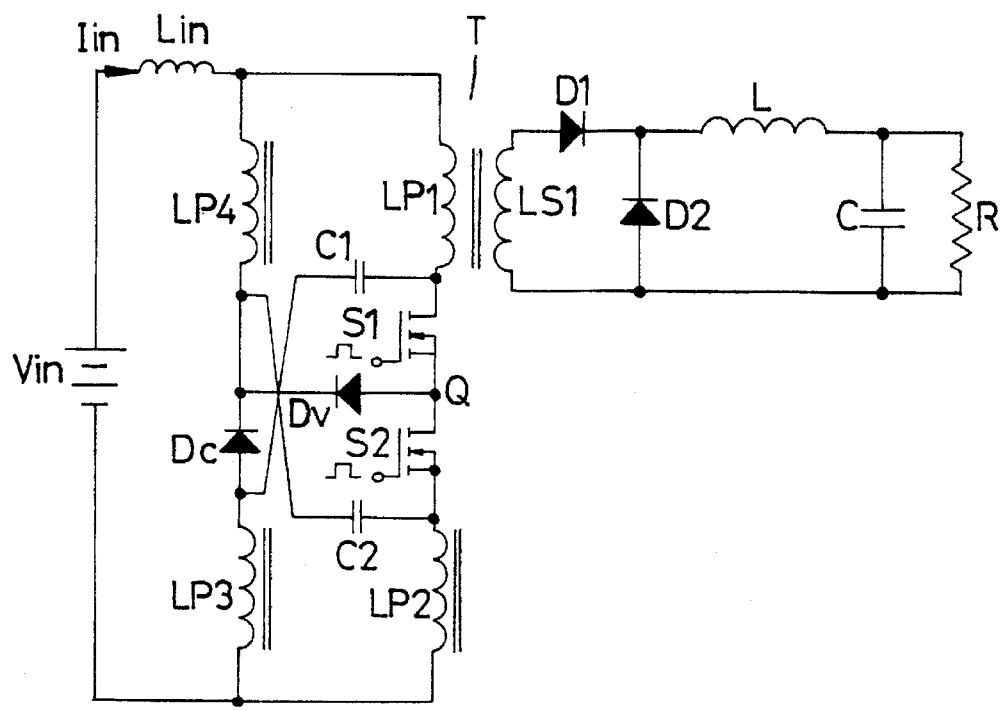
FIG. 1A is a circuit diagram of a forward converter according to a first embodiment of the present invention.

Referring now to drawings wherein like reference characters designate identical or corresponding parts through the several views.

Figure 4A:
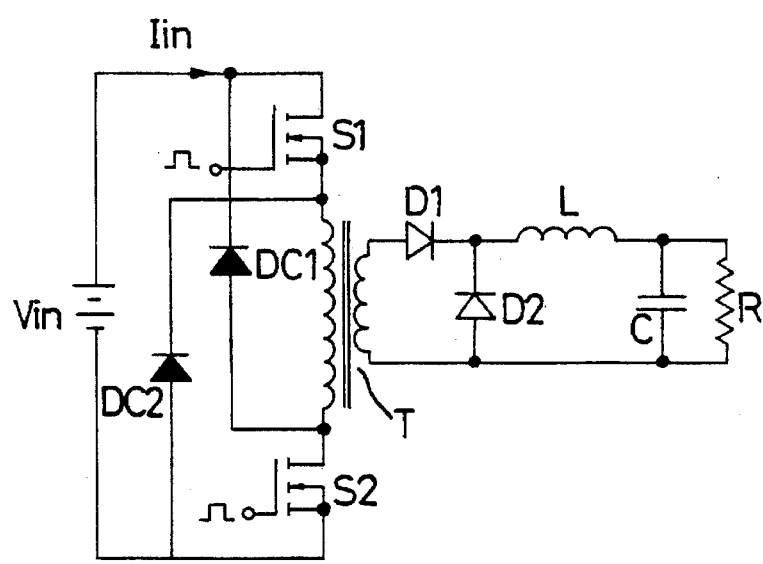
FIG. 4A is a circuit diagram of a forward converter for a conventional power supply.

Referring to FIG. 4A, a circuit diagram of a forward converter without an input filter is shown. The converter includes a transformer T having a primary winding and a secondary winding, two power MOSFETs S1, S2 respectively connected between an end of the primary winding and an end of a DC voltage source Vin, each of the MOSFET S1, S2 having a gate receiving a control pulse from a controller (not shown), two clamping diodes DC1, DC2 cross connected between an end of the primary winding and the voltage source Vin. A diode D1, a freewheeling diode D2, an inductor L, a capacitor C, and a resistor R are connected to the secondary winding of the transformer T in a conventional arrangement and therefore a description thereof is not undertaken. Note that the dots marked near the windings of transformers later mentioned are used to show the instantaneous positive polarity of alternating voltage induced in the windings as a result of transformer action and are named "the first ends" of the windings hereinafter.

Figure 4B:
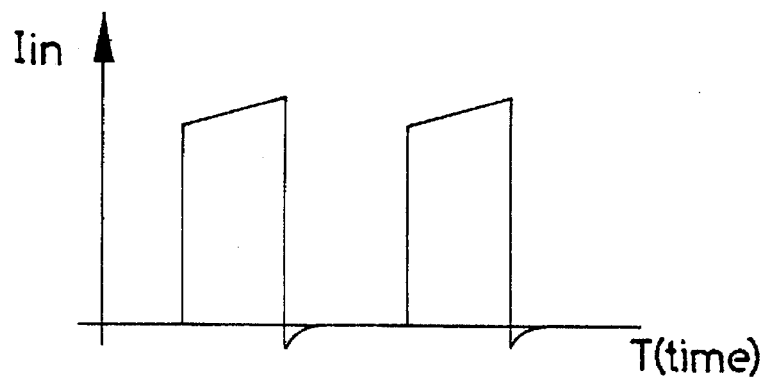
FIG. 4B is an input current waveform of the forward converter in FIG. 4A.

When the power MOSFETs S1, S2 receive a control pulse, the MOSFETs S1, S2 will simultaneously turn on and off, thus a pulsating input current Iin will be derived as shown in FIG. 4B. As such an input current induces additionally power loss and undesired current harmonics as shown in FIG. 4C, there is a need of producing an input current with reduced harmonics for a converter of a switching power supply.

As shown in FIG. 1A, a forward converter for a switching power supply in accordance with this invention is shown, the converter includes a transformer T having four identical primary windings LP1–LP4 each having a first end and a second end and a secondary winding LS1, preferably with a turn ratio of 0.5:0.5:0.5:05:N, two series-connected power MOSFETs S1, S2 connected between the second end of the primary winding LP1 and the first end of the primary winding LP2 and defining a common point Q between the MOSFETs S1, S2 for simultaneously turning on and off in response to a control pulse signal as mentioned in FIG. 4A, a first clamping diode Dv connected between the common point Q of the power MOSFETs S1, S2 and the first end of the primary winding LP4, a second clamping diode Dc connected between the first end of the primary winding LP4 and the second end of the primary winding LP3, a first cross-coupled capacitor C1 connected between the second ends of the primary windings LP1, LP3, and a second cross-coupled capacitor C2 connected between the first ends of the primary windings LP4, LP2. As shown, the first end of the primary winding LP1 and the second end of the primary winding LP4 are connected to a positive electrode of a DC voltage source Vin and the first end of the primary winding LP3 and the second end of primary winding LP2 are connected to a negative electrode of the DC voltage source Vin. An input filter inductor Lin is formed by the leakage inductance of the transformer and stray inductances between the input source Vin and the primary windings of the transformer T. The secondary winding LS1 has an identical connection to that mentioned in FIG. 4A, therefore, the related description is omitted.

Figure 1B:
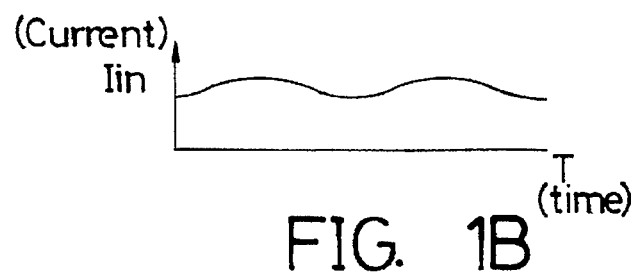
FIG. 1B is an input current waveform of the forward converter in FIG. 1A.
Figure 1C:
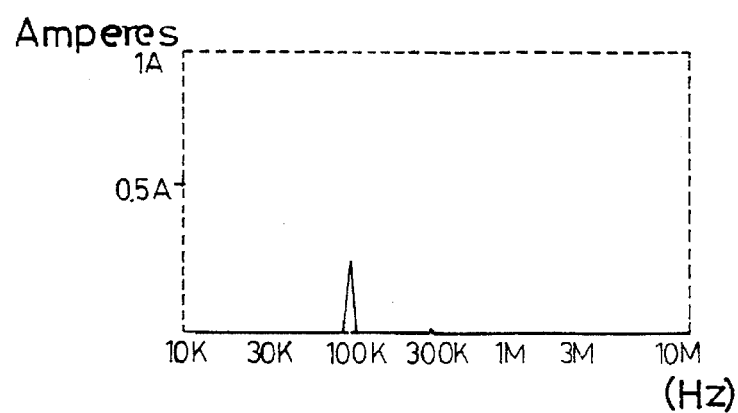
FIG. 1C is a spectrum of the input current in FIG. 1B.
Figure 4C:
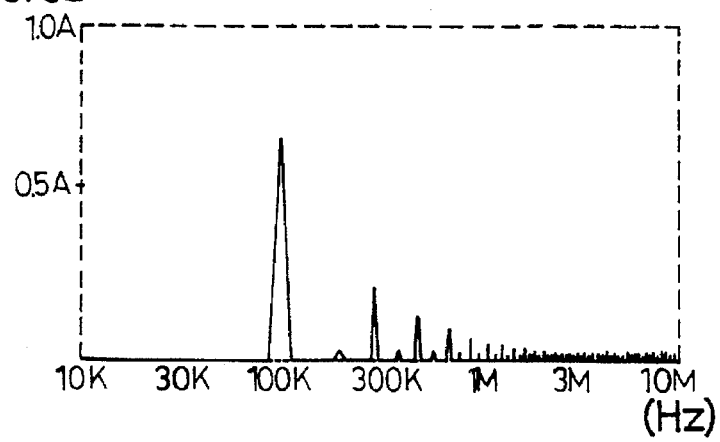
FIG. 4C is a spectrum of the input current in FIG. 4B.

An input current Iin of the converter according to the present invention is shown in FIG. 1B and a spectrum of the input current is shown in FIG. 1C, and it is seen that the undesired harmonic components shown in FIG. 4C have been minimized.

Figure 2:
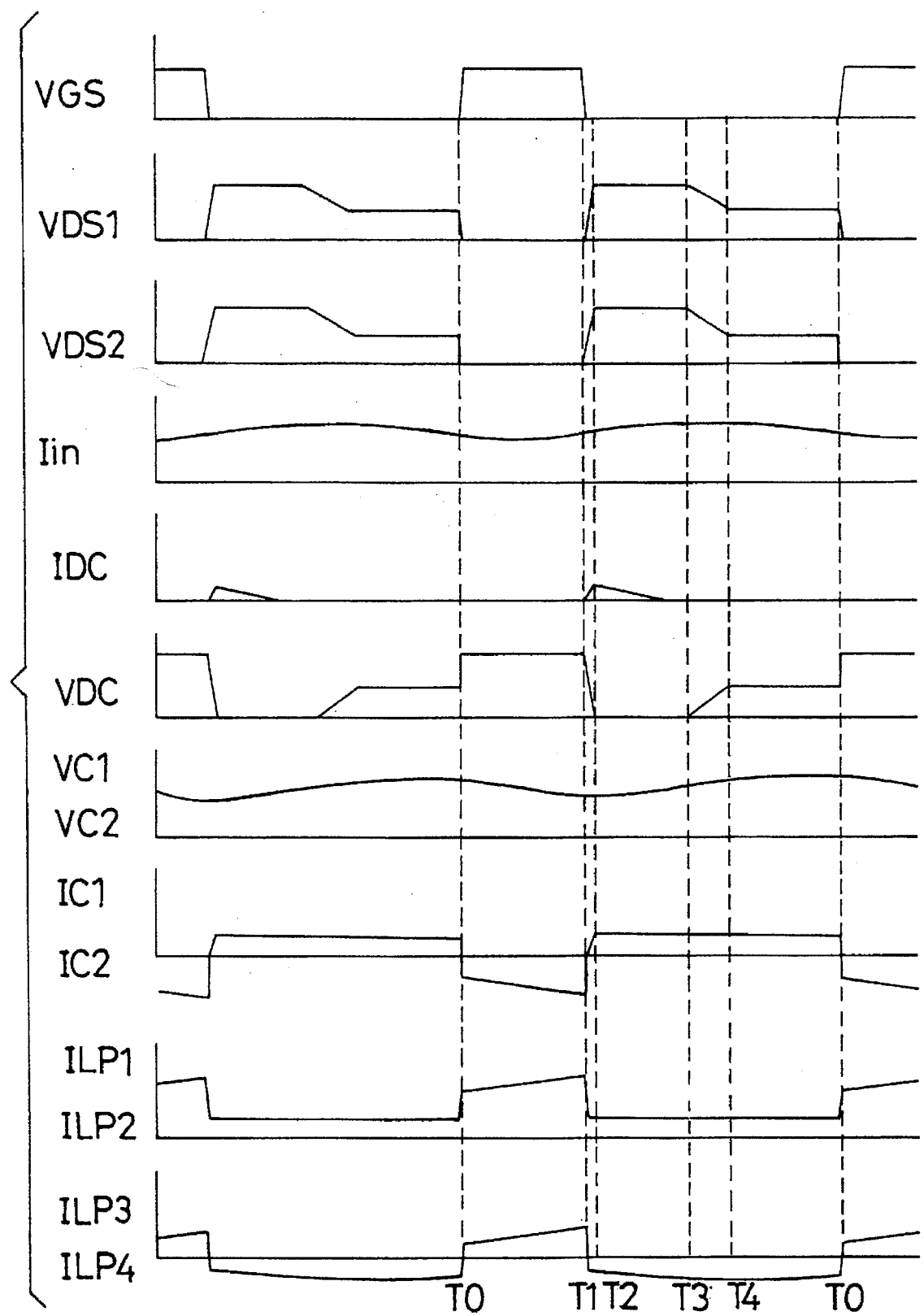
FIG. 2 is a timing diagram of the forward converter in FIG. 1A.

A corresponding timing diagram of a plurality of waveforms for the converter of the present invention is shown in FIG. 2. A voltage between a gate and a source of the MOSFETs S1, S2 is referred to as $V_{GS}$. A voltage between a drain and the source of the MOSFETs S1, S2 is referred to as $VDS_1$, $VDS_2$, respectively. A current flowing within the clamping diode Dc is referred to as $I_{DC}$ and a voltage across the diode Dc is referred to as VDC. A voltage signal in the cross-coupled capacitors C1, C2 is referred to as $V_{C1}$, $V_{C2}$ and a current thereof is referred to as $I_{C1}$, $I_{C2}$. Current flowing within the primary windings LP1–LP4 is respectively expressed by $I_{LP1}$–$I_{LP4}$.

In the time interval of T0–T1, the MOSFETs S1, S2 are turned on and a current loop of LP1-S1-S2-LP2 will be formed to transfer power to the load. Additionally, two current loops C1-S1-S2-LP2-LP3 and C2-LP4-LP1-S1-S2 are formed to recover the energy from capacitors C1, C2 to the load. A voltage $V_{DC}$ across the clamping diode Dc will increase up to 2Vin and remain constant during this time interval T0–T1.

During the time interval T1–T2, the MOSFETs S1, S2 are turned off. Output capacitances of the MOSFETs S1, S2 are linearly charged by a reflected filter inductor current. When a voltage $V_{DS}$ i.e., $V_{DS1}+V_{DS2}$, between a drain and a source of each MOSFET S1, S2 reaches Vin, the forward diode D1 is turned off and the freewheeling diode D2 is turned on at the same time. The cross-coupled capacitors C1, C2 will start to discharge then there will be an inverse current flowing through primary windings LP3 and LP4.

During the time interval T2–T3, the cross-coupled capacitors C1, C2 will be charged by the voltage source Vin. However, as the polarities of the primary windings LP1–LP4, the sum of the voltage of the primary windings LP1–LP3 as well as the primary windings LP2–LP4 are all zero. Consequently, the input filter inductor Lin and the cross-coupled capacitors C1, C2 in parallel will form an LC filter, which induces a low input current ripple and an instantaneous voltage equal to Vin to be presented across capacitors C1, C2. When the clamping diode Dc is turned on, thus the $V_{DS}$ will be clamped to a voltage of 2*Vin. The clamping diode Dv is turned on to assure the voltage $V_{DS2}$ across MOSFET S2 is limited to a voltage Vin equal to the voltage $V_{C2}$ across capacitor C2 and the $V_{DS1}$ of the MOSFET S1 will be also Vin ($V_{DS}-V_{DS2}=2Vin-V_{C2}=2Vin-Vin=Vin$). Thus, the $V_{DS}$ of each MOSFETs S1, S2 is equal to voltage source Vin.

During the time interval T3–T, the clamping diode Dc is turned off at T3 and VDS of the MOSFETs S1, S2 decreases and a voltage across clamping diode Dc will increase to Vin.

During the time interval T4–T0, the $V_{DS}$ will reach Vin and remain in a constant value. At T0, the MOSFETs S1, S2 will be turned on simultaneously and start another switching cycle.

In the above circuit arrangement, the cross-coupled capacitors C1, C2 have achieved a plurality of functions below:

(1) Each capacitor operates as a voltage source with the value equal to the input voltage Vin under steady-state condition. During off-time period, $V_{DS}$ is clamped to 2Vin by the capacitors and the clamping diode Dc. Thus, a reset voltage Vt across the transformer T is provided by the equation: $Vt=V_{C1}+V_{C2}-Vin=Vin$. The maximum duty cycle is thus limited to 50% so that the core can be fully reset.

(2) $VDS_2$ is clamped to $V_{C2}$ by turning on the clamped diode Dv. Therefore, low voltage MOSFET can be used as that in both half-bridge and full-bridge topologies.

(3) Each capacitor provides a current loop, LP1-C1-LP3 and LP4-C2-LP2 to avoid interrupting $i_{Lp1}$ and $i_{Lp2}$ when S1 and S2 turned off. A built-in turn-off snubber function is thus achieved.

(4) With the input inductor Lin, each capacitor performs the built-in filter to maintain the input current in a non-pulsating fashion.

(5) Each capacitor stores and recovers the leakage inductance energy within one cycle so that the converter features spike-free voltage.

Figure 3:
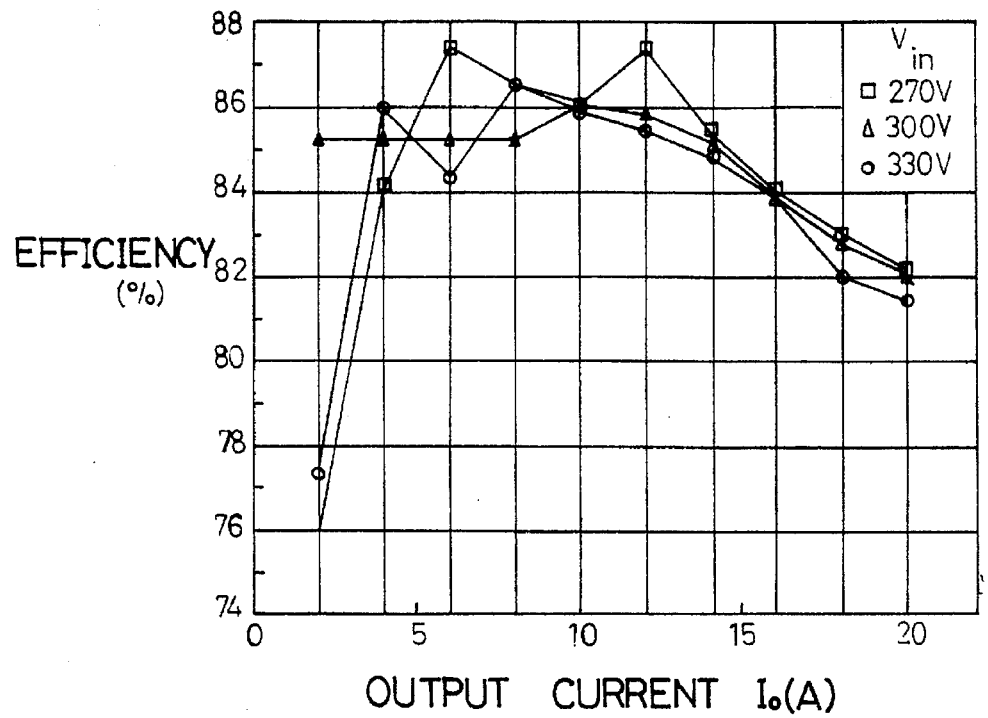
FIG. 3 is a diagram showing an output efficiency of the power supply in combination with the forward converter of the present invention.

Efficiencies versus output currents under a plurality of input voltages have been shown in FIG. 3 and a maximum efficiency of 87.6% is achieved under a low line and half load condition by the present invention.

Although the invention has been explained in relation to its preferred embodiment, it is to be understood that many other possible modifications and variations can be made without departing from the spirit and scope of the invention as hereinafter claimed.

I claim:

1. A forward converter for a switching power supply comprising:

a direct current voltage source having a positive electrode and a negative electrode;

a transformer having four identical primary windings each having a first end and a second end and a secondary winding connected to a load, the first end of a first primary winding and the second end of a fourth primary winding being connected to the positive electrode of the voltage source, the first end of a third primary winding and the second end of a second primary winding are connected to the negative electrode of the voltage source;

two series-connected power switches connected between the second end of the first primary winding and the first end of the second primary winding and defining a common point between the power switches for simultaneously turning on and off in response to a control signal;

a first diode connected between the common point of the power switches and the first end of the fourth primary winding;

a second diode connected between the second end of the third primary winding and the first end of the fourth primary winding;

a first capacitor connected between the second ends of the first and the third primary windings; and a second capacitor connected between the first ends of the second and the fourth primary windings.

* * * * *